United States Patent [19]

Crawford et al.

[11] Patent Number: 5,328,270
[45] Date of Patent: Jul. 12, 1994

[54] HYDRODYNAMIC PUMP

[75] Inventors: Roy P. Crawford, Saratoga; Mats Engwall, Hollister; Larry J. Gilliland, Morgan Hill; Karl Gong; Michel P. Robert, both of San Jose, all of Calif.

[73] Assignee: International Business Machines Corporation, Armonk, N.Y.

[21] Appl. No.: 38,579

[22] Filed: Mar. 25, 1993

[51] Int. Cl.$^5$ .............................................. F16C 32/06
[52] U.S. Cl. ..................................... 384/100; 384/120
[58] Field of Search ............... 384/100, 114, 115, 117, 384/118, 120, 107, 111, 113

[56] References Cited

U.S. PATENT DOCUMENTS

| | | | |
|---|---|---|---|
| 3,669,517 | 6/1972 | Hughes | 384/115 |
| 4,573,810 | 3/1986 | Fust et al. | 384/100 X |
| 4,656,545 | 4/1987 | Kakuta | 360/98 |
| 4,764,034 | 8/1988 | Fust et al. | 384/100 |
| 4,797,009 | 1/1989 | Yamazaki | 384/100 |
| 5,120,139 | 6/1992 | Asada et al. | 384/107 |

FOREIGN PATENT DOCUMENTS 6138217 2/1986 Japan .
01167495 7/1989 Japan .

OTHER PUBLICATIONS

Moffitt and Moss, "Self-Pressurized Air Bearings for Disk File Actuators," IBM TDB, vol. 24, No. 3 Aug. 1981.
Bohn et al., "Arrangement for Driving and Supporting a Component Rotating at High Speed About an Axis," IBM TDB, vol. 29, No. 2, Jul. 1986.
Buchter, H. H., *Industrial Sealing Technology*, John Wiley & Sons, N.Y., Copyright 1979, pp. 382–390.

*Primary Examiner*—Thomas R. Hannon
*Attorney, Agent, or Firm*—James C. Wilson

[57] ABSTRACT

An integrated bearing and pump assembly is formed by positioning a hydrodynamic pump coaxially with respect to a hydrodynamic bearing. The integrated assembly provides pressurized fluid for use within the device incorporating the bearing. The hydrodynamic pump comprises a secondary hydrodynamic bearing incorporated into the primary bearing assembly. The secondary bearing is optimized for high flow pumping applications rather than the high pressure, zero flow requirements of the primary bearing. When the bearing assembly is rotated, fluid flow is provided.

12 Claims, 4 Drawing Sheets

HYDRODYNAMIC PUMP

TECHNICAL FIELD

This invention relates generally to a pumping apparatus that utilizes hydrodynamic bearings to pressurize a fluid and specifically to the incorporation of such a pump into the spindle assembly of a magnetic recording disk drive.

BACKGROUND OF THE INVENTION

A traditional mechanical bearing uses a liquid lubricant in combination with ball bearings to reduce the frictional wear of a rotating shaft. However, when used in high precision, high RPM applications, traditional mechanical bearings have several shortcomings. Ball bearings are not perfectly spherical and the race within which they sit can deform slightly. This can cause random fluctuations in the orientation and position of the rotating shaft. Furthermore, mechanical bearings often wear in ways that increase the magnitude of these random displacements. In addition, wear particles and lubricant can spread from the mechanical bearing and contaminate the device incorporating the rotating shaft.

Because of the above difficulties, a gas bearing is often the preferred way of supporting a rapidly rotating shaft for some applications. Gas bearings may use either hydrostatic or hydrodynamic principles of operation. In a hydrostatic bearing a source of pressurized gas is supplied between a rotating shaft and its surrounding sleeve. The gas acts as a lubricant and allows the shaft to rotate without coming into contact with the sleeve. In a hydrodynamic bearing, oblique grooves are cut in a shaft and the rotation of the shaft causes gas to flow through the grooves. The dynamic pressure created by this gas flow allows the gas to act as a lubricant. In many applications, the lubricant gas used is simply filtered air. For other applications, noble gases or nitrogen may be preferred because of their relative inertness.

The pressure created by hydrodynamic gas bearings can be sizable. However, this pressure is usually unavailable for other uses within a device. Any attempt to bleed gas flow from a gas bearing would seriously affect its ability to function properly. Therefore, devices that incorporate hydrodynamic gas bearings are unable to utilize the pressurized gas created by the rotating shaft. If such a device requires a long-term source of pressurized gas it must incorporate a mechanical compressor. These compressors are often undesirable since they occupy space within the device, consume power, and are a source of vibration and contamination.

For the foregoing reasons, there is a need for an apparatus that allows the gas pressure created by a hydrodynamic bearing to be utilized for other purposes by the device incorporating the bearing.

SUMMARY OF THE INVENTION

The present invention is directed to an apparatus that satisfies this need by positioning a hydrodynamic pump coaxially with respect to a hydrodynamic bearing. This configuration allows an integrated bearing and pump assembly to provide pressurized fluid to various functions within the device incorporating the bearing.

One type of device that could benefit from an integrated bearing and pump assembly is the magnetic recording disk drive. Disk drives incorporate rapidly rotating shafts to spin magnetic recording media below read/write heads. Higher rotation speeds are desirable since they result in faster access to data. However, rotation rates above 10,000 RPM are not practical with mechanical bearings. In addition, the random fluctuations of a mechanical bearing reduce the accuracy with which a read/write head can be positioned with respect to the rotating disk. This in turn limits the recording densities that can be achieved. Therefore, some magnetic recording disks are supported by an air bearing spindle which consists of a hydrodynamic journal bearing to support radial loads and a hydrodynamic thrust bearing to support axial loads. Furthermore, disk drives can utilize the gas flow that an integrated pump assembly can provide. Some potential uses for the gas pressure include pressurizing hydrostatic bearings in the actuator portion of the disk drive, creating positively pressurized areas for contamination control, and providing pressure for operating pneumatic latches.

Therefore, in one embodiment, the invention comprises a disk drive system having an air bearing spindle wherein a section of the spindle assembly is designed to act as an air pump. More particularly, an additional air bearing is incorporated into the disk drive's spindle assembly. The additional bearing is optimized for high flow pumping applications rather than the high pressure, zero flow requirements of the primary air bearing. When the spindle assembly is rotated, air flow is provided. Therefore, the pressure source is as reliable as the primary journal bearing.

A hydrodynamic pump having features of the present invention comprises a spindle hub with a fluid bearing inner surface and a sleeve positioned coaxially within the spindle hub. The sleeve is attached to a support base and has a smooth fluid bearing inner surface and a grooved fluid bearing outer surface for generating dynamic fluid pressure. A passage in the sleeve allows lubricating fluid to flow from the fluid bearing outer surface of the sleeve to the base. A shaft connected to the spindle hub and positioned coaxially within the sleeve has a grooved fluid bearing outer surface for generating dynamic fluid pressure.

Means are provided for rotating the shaft so that a first hydrodynamic bearing is formed between the fluid bearing inner surface of the spindle hub and the fluid bearing outer surface of the sleeve. Similarly, the rotation of the shaft causes a second hydrodynamic bearing to form between the fluid bearing inner surface of the sleeve and the fluid bearing outer surface of the shaft. This second bearing; acts to prevent frictional wear between the shaft and sleeve. The first bearing is optimized for high flow pumping applications rather than the high pressure, zero flow requirements of the second bearing. The dynamic pressure in the first hydrodynamic bearing acts to pump the lubricating fluid through the passage in the sleeve to the base.

This invention thus provides an integrated bearing assembly that provides pressurized fluid without the contamination, vibration and power consumption problems of conventional compressors and pumps. Further features and advantages of the invention will become apparent from the following specification and the accompanying drawings.

DETAILED DESCRIPTION OF THE PREFERRED EMBODIMENTS

Figure 1:
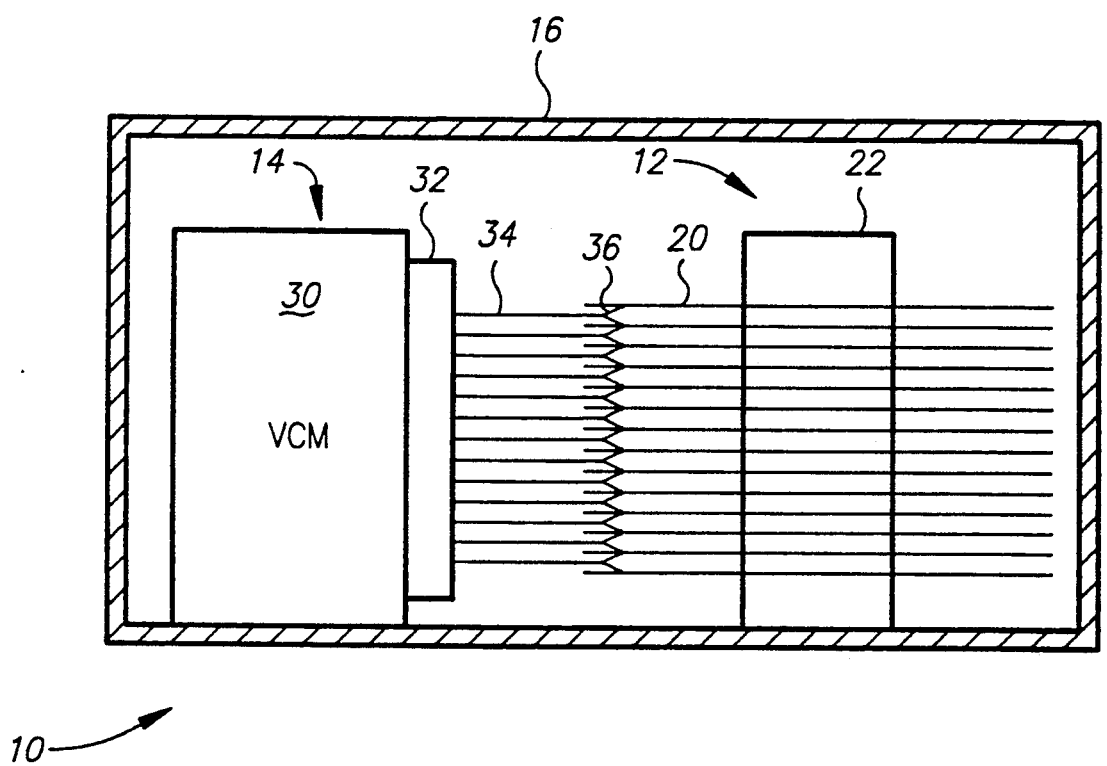
FIG. 1 is a schematic diagram of a disk drive system according to the present invention.

With reference to FIG. 1, a schematic diagram of a disk drive embodiment of the present invention is illustrated and is designated by the general reference number 10. System 10 comprises a disk spindle assembly 12 and a head actuator assembly 14. Spindle assembly 12 and held actuator assembly 14 are located within a sealed housing 16 to prevent particulate contamination. Spindle assembly 12 comprises a plurality of magnetic recording disks 20 which are mounted to a spindle 22. Spindle 22 is rotated by an in-hub electrical motor which is not illustrated. Head actuator assembly 14 comprises a voice coil motor 30 which moves an actuator arm assembly 32 relative to the disks 20. Assembly 32 has a plurality of actuator arms 34, each of which is positioned in a space between two adjacent disks 20. Each actuator arm 34 has a pair of read/write heads 36. One head reads the disk positioned above the actuator arm 34 and the other reads the disk positioned below the actuator arm 34.

In operation, spindle 22 is rotated by the in-hub motor and motor 30 moves the actuator arms 34 between the disks 20 to the desired track location. One of the heads 36 then reads or writes data on the desired track.

Figure 2:
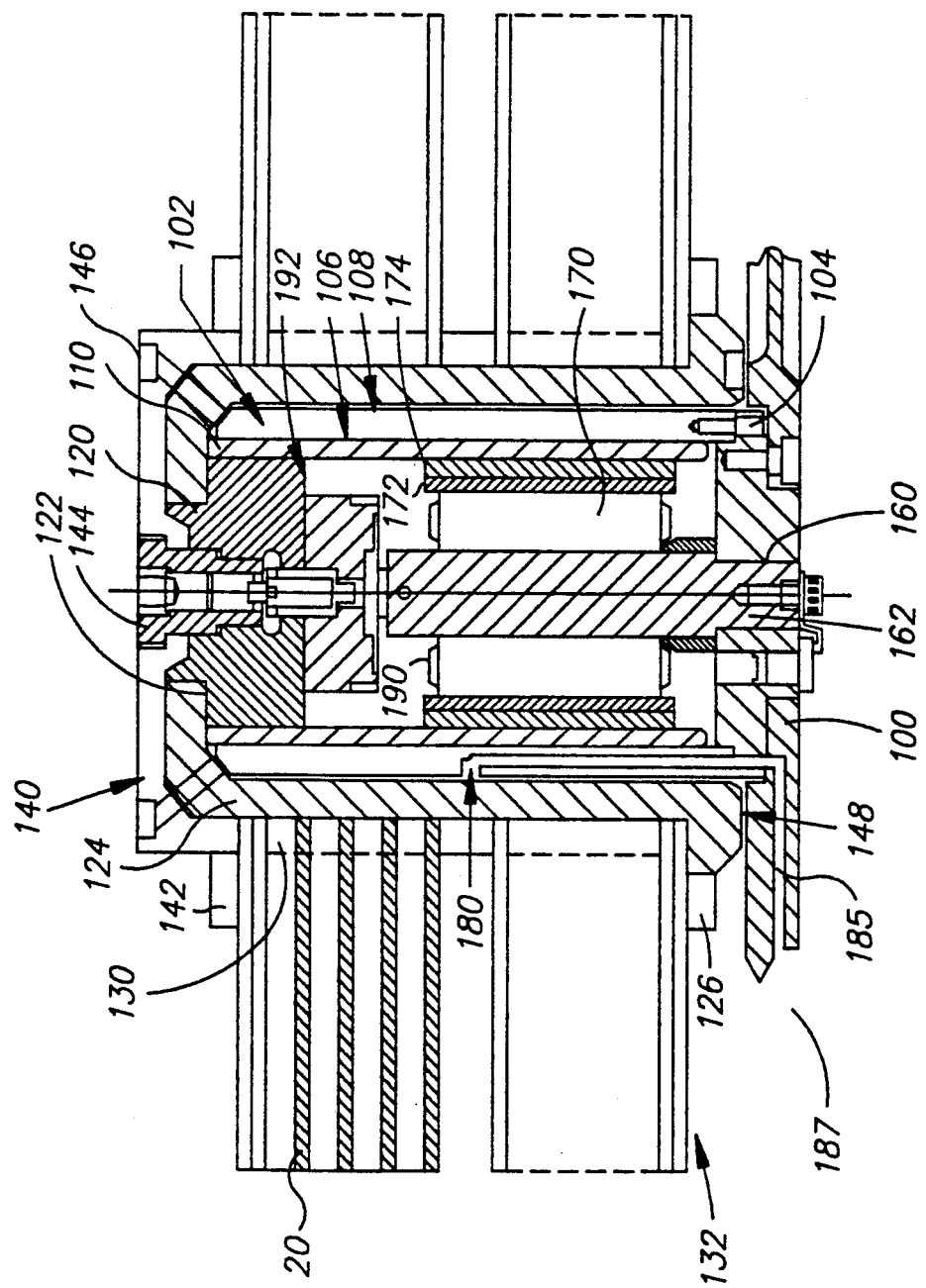
FIG. 2 is a cross-sectional view of one embodiment of the disk spindle assembly of the present invention.

FIG. 2 is a cross sectional view of spindle assembly 12. A base member 100 is attached to a stationary cylindrical sleeve 102 by a plurality of screws 104 or other suitable attachment means such as adhesive bonding. Sleeve ].02 has an inner surface 106 which is a smooth air bearing surface. The outer surface 108 of sleeve 102 is an air bearing surface on which a plurality of pressure generating grooves have been created. The grooves are cut obliquely to "the longitudinal axis of the sleeve and will be discussed further with respect to FIG. 3.

A rotatable shaft 110 fits inside sleeve 102. Shaft 110 has an outer air bearing surface on which a plurality of pressure generating grooves have been machined. The grooves are cut obliquely to the longitudinal axis of the shaft and will be discussed further with respect to FIG. 3. There is a gap between sleeve 102 and shaft 110 in which the primary air bearing is formed. In the preferred embodiment, this gap is approximately 160 microinches.

A shaft end plug 120 is shaped to fit inside the top portion of shaft 110 by an interference shrink fit. End plug 120 has a edge portion 122 for receiving a disk spindle hub 124. Spindle hub 124 is shrink fitted to end plug 120. The gap between spindle hub 124 and sleeve 102 is approximately 300 microinches in the preferred embodiment. In this gap the pump bearing is formed.

A slot 180 is cut by a lathe or other means around the outer circumference of sleeve 102. The slot 180 is positioned substantially at the midpoint of the length of sleeve 102. In fluid communication with slot 180 is passage 185 which extends from slot 180 along the body of sleeve 102 and through base 100 to an outlet 187.

A plurality of magnetic recording discs 20 and annular spacer members 130 fit over spindle hub 124 and rest on flange 126. The disks 20 and spacers 130 are arranged in an alternating manner and comprise disk stack 132. A disk clamp 140 fits over the disk stack 132 and secures it in place. Clamp 140 has a flange 142 which corresponds to flange 126 of spindle hub 124. Clamp 140 is attached to shaft end plug 120 by means of a screw 144.

A plurality of gas inlets 146 pass through clamp 140 and hub 124 to bring the primary bearing and pump bearing in fluid communication with the gas outside the spindle assembly. Similarly, the gap 148 between base 100 and hub 124 provides a path for air to enter the pump bearing.

Base 100 has an aperture 160 for receiving a motor mounting post 162, Post 162 is attached to base 100 by a plurality of screws or an interference shrink fit. A stator winding assembly 170 is attached to post 162. A plurality of rotor magnets 172 are attached to a cylindrical magnetic mounting member 174, also known in the art as backing iron, which in turn is attached to the inside surface of shaft 110. Alternatively, magnets 172 could be made of a single cylinder of magnetic material that has been magnetized with a plurality of alternating magnetic sections (poles). The winding assembly 170, rotor magnets 172 and member 174 comprise an in-hub brushless spindle motor 190 which rotates shaft 110. An eight pole, twelve slot delta wound brushless DC spindle motor may be used in the preferred embodiment.

A thrust bearing to support axial loads is formed in the thrust gap 192. This bearing supports the spindle hub 124 and its attached disks 20. The details of the thrust bearing are not essential to an understanding of the present invention and will not be discussed. A detailed description of a thrust bearing that could operate in conjunction with the present invention is disclosed in IBM application Serial No. 07/813,311 entitled "Spindle System for a Disk Drive" filed on Dec. 23, 1991 and hereby incorporated by reference.

In the preferred embodiment, base 100, sleeve 102, shaft 110, end plug 120, clamp 140, screw 144 are all made of hardened stainless steel in order to provide long life and corrosion resistance. The use of a single material also helps reduce thermal distortions during operation. The spindle hub 124 is aluminum which more closely matches the thermal expansion coefficient of the disks 20, which are often fabricated from aluminum substrates.

The operation of spindle assembly 12 may now be understood. Initially shaft 110 is at rest. When motor 190 is energized, it causes shaft 110 and attached hub 124 to rotate. Air is pulled in through inlets 146 and gap 148 and forms a primary air bearing between the shaft 110 and sleeve 102 and a pump bearing between the sleeve 102 and the hub 124. Air from inlets 146 and gap 148 exits the pump bearing via passage 185.

Figure 3:
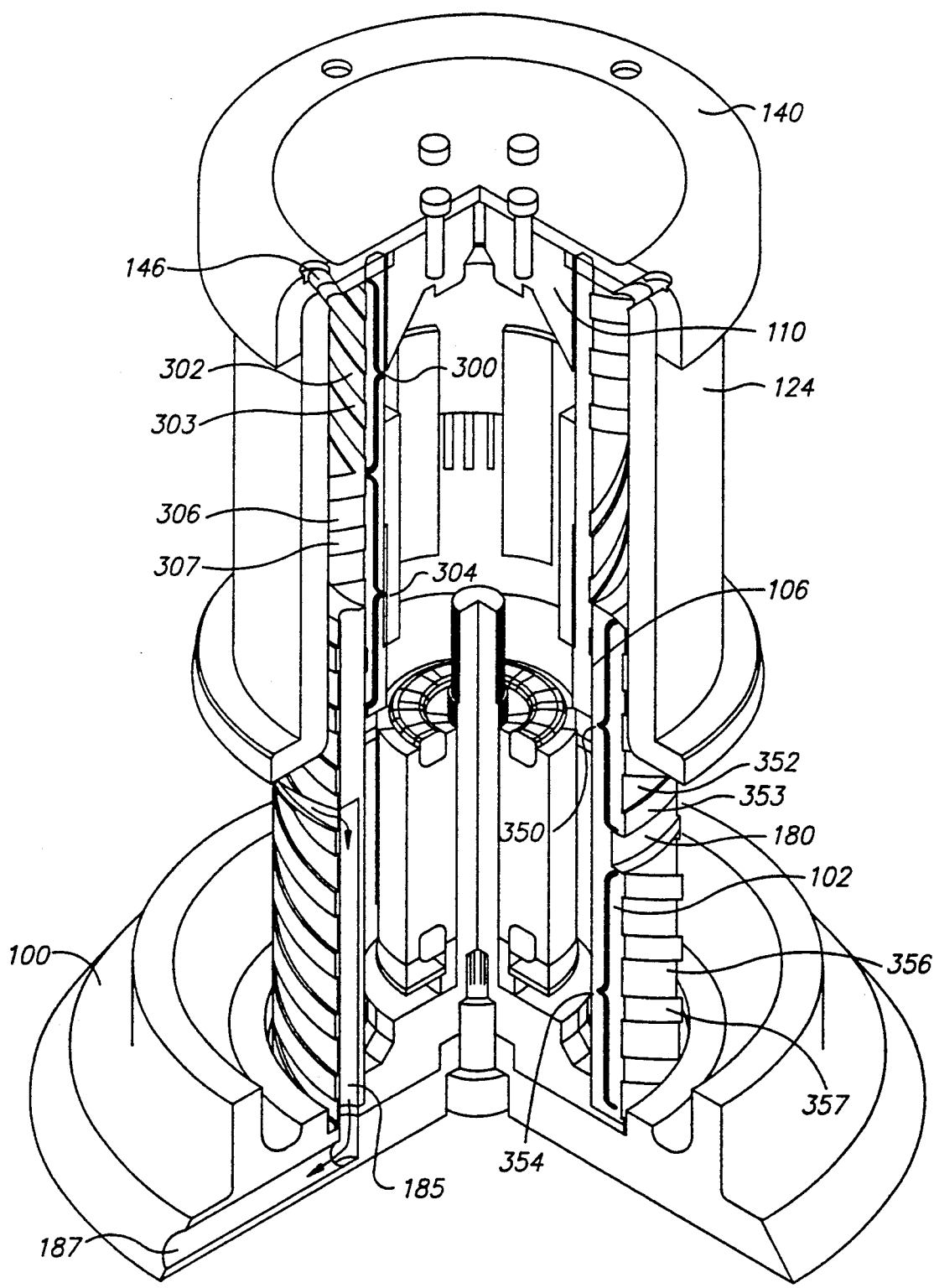
FIG. 3 is an exploded cutaway perspective view of a bidirectional flow embodiment of the present invention.

FIG. 3 is an exploded perspective view of the spindle assembly of FIG. 2 with the thrust bearing assembly and disks removed for clarity. The hub 124 and attached shaft 110 are displaced from their normal operating positions so as to more clearly show the internal structure of the present invention. Shaft 110 of FIG. 3 has an upper groove area 300 having grooves 302 and a lower groove area 304 having grooves 306. Grooves 302 are designed to pull air downward into the primary air bearing gap. Grooves 306 are designed to pull air upward into the primary air bearing gap.

The number of grooves, their depth, their angle and other parameters are all dependent upon the required size and operating characteristics of the resultant air bearing. Examples of operating characteristics include rotation rate, supported load, and bearing stiffness.

Most operating characteristics are dictated by the requirements of the device incorporating the bearing. For example, in a disk drive the rotation rate of the air bearing is dictated by the required rotation rate of the disks, The hydrodynamic equations and design trade-offs that determine the groove parameters are well known in the art and discussed in references such as William A. Gross et al., Fluid Film Lubrication, New York, John Wiley and Sons, 1980. Many modifications and adaptations of the described parameters may occur to one skilled in the art without departing from the scope of the present invention.

Grooves 302 and 306 have depths, groove widths and groove angles that are determined by the operational requirements of the primary bearing. The groove angle for grooves 306 is the reverse of that for grooves 302. Grooves 302 and 306 are preferably formed by photolithographic etching processes for stainless steel. The area not etched between the grooves defines a plurality of lands 303 and 307.

In operation, shaft 110 rotates such that disk clamp 140 in FIG. 3 rotates clockwise as viewed from the top. Grooves 302 draw air downward and grooves 306 draw air upward to form the primary air bearing.

Sleeve 102 has an upper groove area 350 having grooves 352 and a lower groove area 354 having grooves 356. Grooves 352 are designed to pull air downward into the pump bearing gap. Grooves 356 are designed to pull air upward into the pump bearing gap. Grooves 352 and 356 preferably have depths of 1650 microinches. The groove angle is preferably 158 degrees. The groove angle for grooves 356 is the reverse of that for grooves 352. Grooves 352 and 356 are preferably formed by photolithographic etching processes for stainless steel. The area not etched between the grooves defines lands 353 and 357.

The Groove/Groove+Land Ratio of the pump bearing is defined as the width of a groove divided by the sum of the width of a groove and one of its adjacent lands. This ratio is often presented as a percentage. The preferred Groove/Groove+Land Ratio of the pump bearing is approximately 80%.

In operation, shaft 110 and attached hub 124 rotate such that grooves 352 draw air downward and grooves 356 draw air upward to form the pump bearing.

Figure 4:
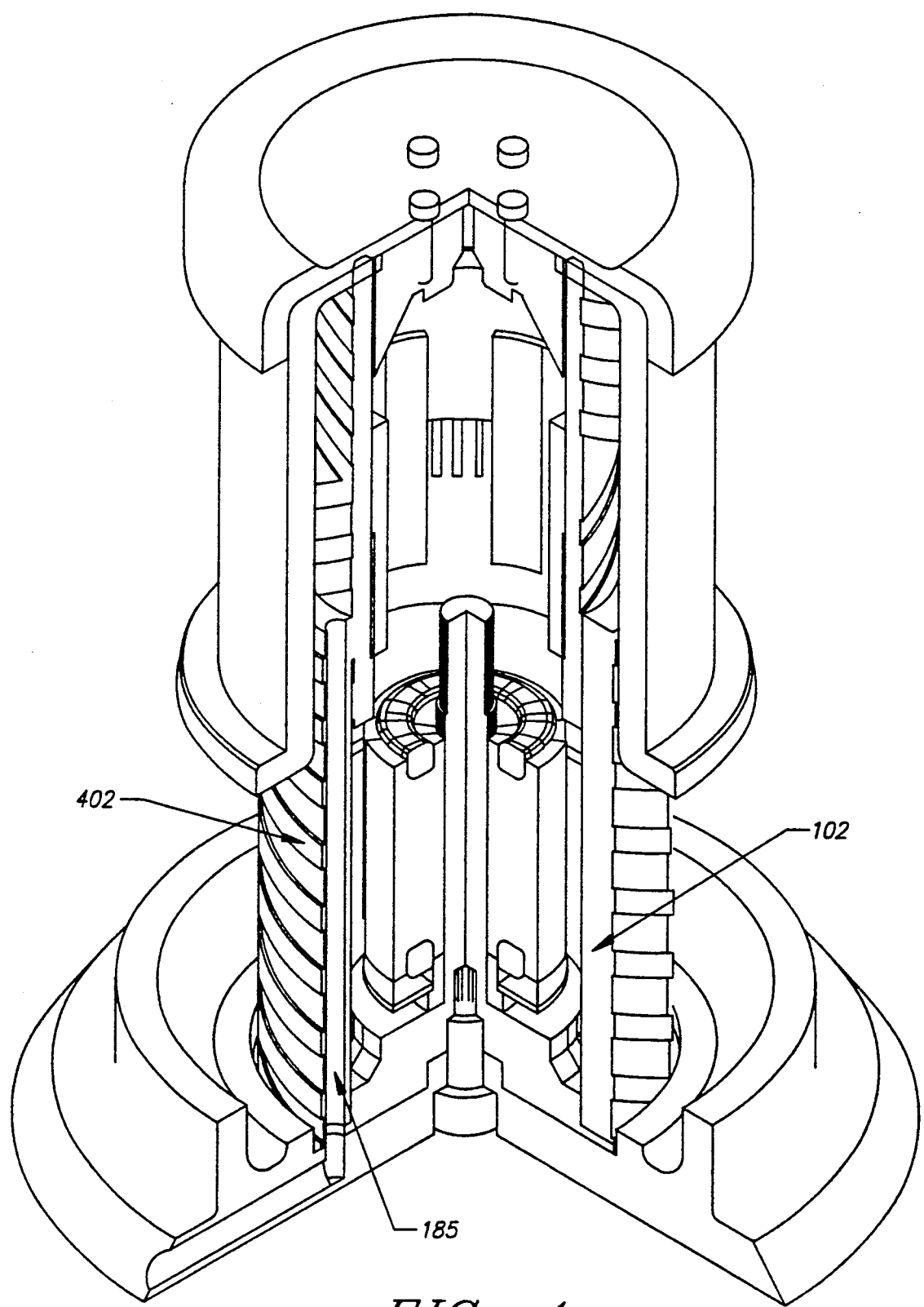
FIG. 4 is an exploded cutaway perspective view of a unidirectional flow embodiment of the present invention.

FIG. 4 depicts an alternative embodiment of the invention wherein the grooves 402 on the outer surface of sleeve 102 are all parallel and push the lubricant gas in one direction. For this reason the embodiment is referred to as a unidirectional configuration. The embodiment depicted in FIG. 3. is referred to as a bidirectional configuration since it pulls the lubricant gas in from the top and bottom of the pump bearing. In the unidirectional embodiment slot 180 has been removed and passage 185 extends the entire length of sleeve 102. In addition, gas inlets 146 have been removed so that the upward air flow generated by the grooves 402 is redirected down passage 185. Table 1 compares the design parameters of the unidirectional and bidirectional embodiment.

TABLE I

|  | Bidirectional: (Intake from both ends, pressure tap at center) | Unidirectional: (Intake at one end, pressure tap at opposite end) |
| --- | --- | --- |
| Pressure: | 3 psi | 3 psi |
| Flow: | 1.2 lpm | 1.2 lpm |
| Rotation | 10,000 RPM | 10,000 RPM |

TABLE I-continued

|  | Bidirectional: (Intake from both ends, pressure tap at center) | Unidirectional: (Intake at one end, pressure tap at opposite end) |
| --- | --- | --- |
| Rate |  |  |
| Diameter: | 42.8 mm | 42.8 mm |
| Radial Clearance | 300 microinches | 300 microinches |
| Number of Grooves: | 20 | >20 |
| Groove depth: | 0.00165 in | 0.0022 in |
| Groove/Groove + Land Ratio: | 80% | 91% |
| Groove Angle: | 158 degrees | 154 degrees |
| Length | 50 mm | 50 mm |

Although the present invention has been described in considerable detail with reference to certain preferred versions thereof, other versions are possible. For example the working medium of the pump is not limited to a gas. This type of hydrodynamic pump could be adapted to pump liquids such as oil or water by modifying the bearings as is known in the art. Also, the embodiments described have shown the pump bearing as aligned with and the same length as the journal bearing. This is not an operational requirement. The pump bearing could be a different length than the primary bearing and/or displaced axially from the primary bearing and/or divided into multiple sections if required. Similarly, although the advantages of the present invention have been described in the context of magnetic disk drives, it would occur to one skilled in the art that the described fluid pump would have advantages in other devices that incorporate hydrodynamic bearings, such as high precision machine tools. It should be apparent that other modifications and adaptations of the described embodiments may occur to one skilled in the art without departing from the scope of the present invention as set forth in the following claims.

We claim:

1. A pump comprising:
   a first cylinder having a fluid bearing inner surface;
   a second cylinder positioned coaxially within the first cylinder and attached to a base, the second cylinder having a fluid bearing inner surface and a fluid bearing outer surface, the fluid bearing outer surface having at least one dynamic pressure generating groove;
   a shaft positioned coaxially within the second cylinder, the shaft having a fluid bearing outer surface having at least one dynamic pressure generating groove;
   a clamp for attaching the shaft to the first cylinder;
   means for rotating the shaft so as to form a first hydrodynamic fluid bearing between the first cylinder and the second cylinder and a second hydrodynamic fluid bearing between the second cylinder and the shaft;
   an inlet for a lubricating fluid; and
   a passage in the body of the second cylinder extending from the fluid bearing outer surface of the second cylinder to the base wherein dynamic pressure in the first hydrodynamic fluid bearing pumps the lubricating fluid through the passage.

2. The pump of claim 1 wherein the passage intersects the fluid bearing outer surface of the second cylinder at a point substantially midway along the length of the second cylinder.

3. The pump of claim 1 wherein the lubricating fluid is a gas.

4. The pump of claim 1 wherein the lubricating fluid is a liquid.

5. A spindle system comprising:

a spindle hub having a fluid bearing inner surface;

a sleeve positioned coaxially within the spindle hub and adapted for attachment to a support base, the sleeve having a fluid bearing inner surface, a fluid bearing outer surface, and a passage providing fluid communication from the fluid bearing outer surface to the base, the fluid bearing outer surface having means for generating dynamic fluid pressure;

a shaft connected to the spindle hub and positioned coaxially within the sleeve, the shaft having a fluid bearing outer surface having means for generating dynamic fluid pressure; and means for rotating the shaft so as to form a first hydrodynamic fluid bearing between the fluid bearing inner surface of the spindle hub and the fluid bearing outer surface of the sleeve and a second hydrodynamic fluid bearing between the fluid bearing inner surface of the sleeve and the fluid bearing outer surface of the shaft;

wherein during rotation of the shaft and in the presence of a lubricating fluid in said first and second hydrodynamic fluid bearing, dynamic pressure in the first hydrodynamic fluid bearing pumps the lubricating fluid through the passage in the sleeve.

6. The spindle system of claim 5 wherein the passage intersects the fluid bearing outer surface of the sleeve at a point substantially midway along the length of the second cylinder.

7. The spindle system of claim 5 wherein the lubricating fluid is a gas.

8. The spindle system of claim 5 wherein the lubricating fluid is a liquid.

9. A data recording disk drive comprising:

a spindle hub having a fluid bearing inner surface;

a recording disk attached to the spindle hub;

means for moving a transducer for reading data from or writing data to the recording disk;

a sleeve position coaxially within the spindle hub and fixedly attached to a base; the sleeve having a fluid bearing inner surface, a fluid bearing outer surface, and a passage providing fluid communication from the fluid bearing outer surface to the base, the fluid bearing outer surface having means for generating dynamic fluid pressure;

a shaft connected to the spindle hub and positioned coaxially within the sleeve, the shaft having a fluid bearing outer surface having means for generating dynamic fluid pressure; and means for rotating the shaft so as to form a first hydrodynamic fluid bearing between the fluid bearing inner surface of the spindle hub and the fluid bearing outer surface of the sleeve and a second hydrocynamic fluid bearing between the fluid bearing inner surface of the sleeve and the fluid bearing outer surface of the shaft;

wherein, during rotation of the shaft, dynamic pressure in the first hydrodynamic fluid bearing pressurizes a lubricating fluid and pumps it through the passage in the sleeve.

10. The data recording disk drive of claim 9 wherein the passage intersects the fluid bearing outer surface of the sleeve at a point substantially midway along the length of the sleeve.

11. The data recording disk drive of claim 9 wherein the lubricating fluid is a gas.

12. The data recording disk drive of claim 9 wherein the lubricating fluid is a liquid.

* * * * *